Figures 1, 2:
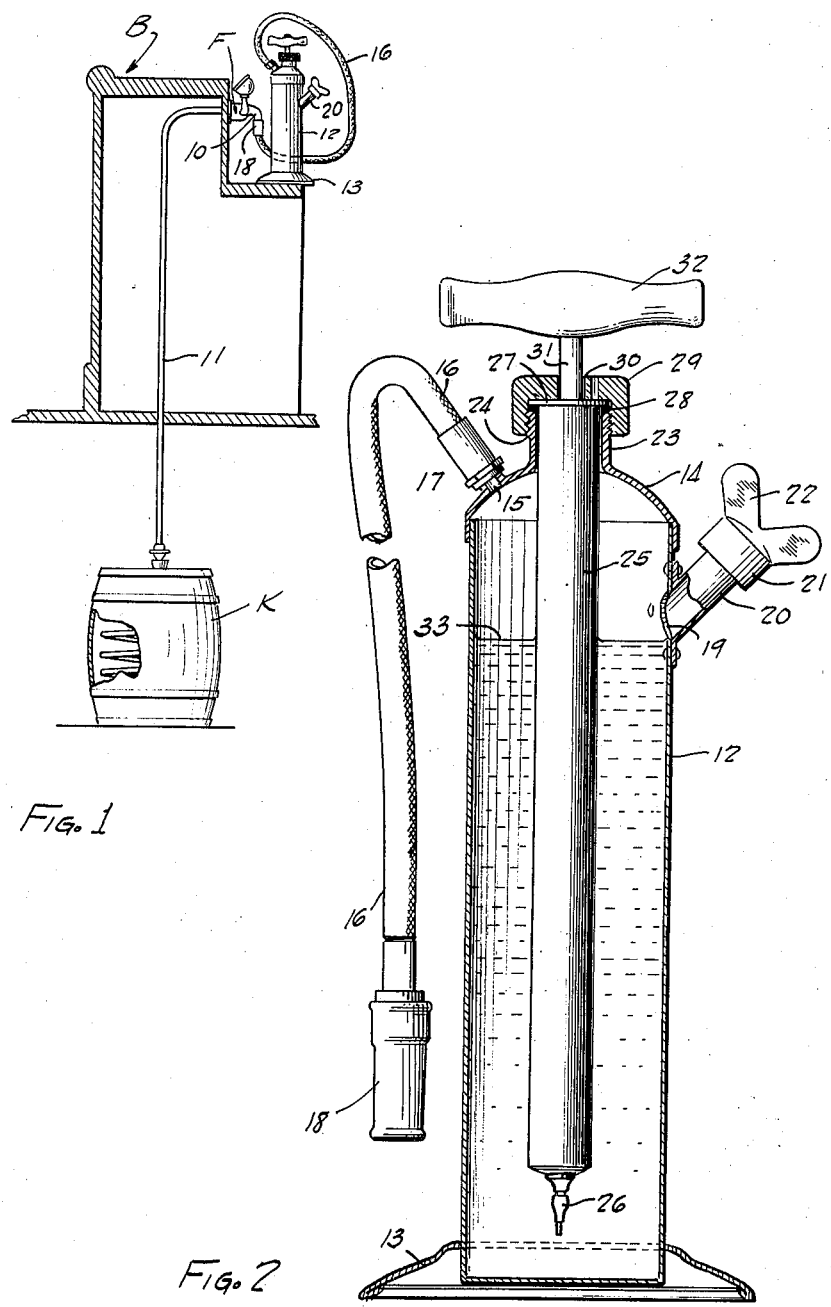

Aug. 29, 1939. W. G. DOH 2,171,142

CLEARING DEVICE FOR BEER DISPENSING SYSTEMS

Filed Nov. 1, 1937

INVENTOR.
WILLIAM G. DOH.
BY Joshua H. Hotts
ATTORNEY.

Patented Aug. 29, 1939

2,171,142

UNITED STATES PATENT OFFICE 2,171,142

CLEARING DEVICE FOR BEER DISPENSING SYSTEMS

William G. Doh, Philadelphia, Pa.

Application November 1, 1937, Serial No. 172,236

4 Claims. (Cl. 225—1)

This invention has to do with the commercial dispensing of beer such as commonly takes place in tap rooms, saloons and similar places and the invention is concerned primarily with maintaining the beer in a salable condition.

Ordinarily beer is sold by breweries to tap rooms, saloons and the like in kegs which are positioned conveniently to the dispensing bar. This bar carries a dispensing faucet which is connected by appropriate conduits to the keg. The beer is either cooled in the keg itself, or the connections between the keg and the faucet include coils which are subject to the effects of a refrigerant to bring the beer to the temperature required to render it salable.

Regardless of which system of installation is employed there is always a certain amount of beer between the dispensing faucet and the place of cooling (whether the coils or keg) which is not subject to the immediate effects of the cooling medium. As a result when the faucet is idle for any appreciable period this unrefrigerated beer rises in temperature, with the result that when it is drawn off it is in an unsalable state. This may be due to the rise in temperature alone, or the fact that the rise in temperature renders the gaseous content of the beer so active as to cause excess foaming.

While this rise in temperature of the beer from the faucet to the point of cooling may be caused by "lull" intervals during the business day, it is inevitable in the closing down overnight, which is usually required by state regulations. The ultimate result is that each morning the tap room owner must draw off a certain quantity of beer which is thrown away and represents a complete loss.

With the foregoing conditions in mind this invention has in view, as its foremost objective, the provision of apparatus which may be employed in conjunction with a beer dispensing system, including a dispensing faucet for returning that beer which is contained in the system between the faucet and point of cooling back to the place where it is subject to the effects of the cooling medium.

More in detail this invention has in view as an objective the provision of apparatus which may be employed to force air under pressure into the faucet with the pressure of the air sufficient to overcome the pressure of the beer, whereby the beer is forced backwardly towards the keg. Thus the air replaces the beer in that space between the faucet and the point of cooling.

In carrying this idea out in a practical embodiment this invention contemplates the use of apparatus for initially pumping air through water whereby the air is washed and clarified so that any effects it has on the beer in the system will be beneficial.

Various other more detailed objects and advantages will in part become apparent and in part be hereinafter stated, as the description of the invention proceeds.

The invention, therefore, comprises apparatus which is designed to be connected to a beer dispensing faucet and which includes a pump which may be operated to compress air that is first passed through water and then past the faucet whereby the beer between the faucet and point of cooling is replaced by the compressed air.

For a full and more complete understanding of the invention reference may be had to the following description and accompanying drawing, wherein Figure 1 is a side view somewhat diagrammatic taken as a section through a dispensing bar, developing the manner in which the apparatus of this invention may be applied to a conventional beer dispensing system, and Figure 2 is an enlarged detailed view taken as a section through the apparatus.

Referring now to the drawing, wherein like reference characters denote corresponding parts, a bar is shown in Figure 1 and referred to generally by the reference character B. This bar ordinarily includes a faucet F having a discharge spout 10. A source of supply of beer is represented by the keg K, and this keg K is connected to the faucet F by a conduit represented at 11.

At this point it is well to note that the invention is not to be limited to the particular type of dispensing system illustrated in Figure 1. This figure is intended to depict that arrangement now meeting with a certain amount of public approval, in which cooling coils are included in the keg K and hooked up with an appropriate refrigerating system. Thus the beer is cooled in the keg itself.

The invention takes cognizance of the fact that there are other systems meeting with widespread use in which the conduit 11 includes cooling coils that are immersed in a refrigerant to obtain the desired cooling effects. In any event there is a certain extent of the conduit 11 between the faucet F and the point of cooling.

In accordance with conventional practice beer in the keg K is subject to a required amount of gas pressure which may be either that of the beer itself or the pressure of the beer supplemented by air or gas that is introduced into the keg K under pressure, and this pressure serves to maintain the beer in the conduit 11 up to the control valve in the faucet F.

When a tap room owner is desirous of closing down his place of business for the night, in accordance with this invention he avails of the apparatus shown in detail in Figure 2 to return the beer that is contained in the line 11 between the faucet F and the keg K back into the keg. This apparatus comprises a cylindrical chamber 12 which may be mounted on a suitable supporting base in the form of a pedestal 13.

The cylindrical chamber 12 is provided with a top closure 14 that is formed with an outlet port at 15, and which outlet port is connected with a flexible conduit 16 by a coupling represented at 17. The free end of the flexible conduit 16 is provided with a coupling member 18 that is designed to be quickly attached to the spout 10 of the faucet F. This coupling member 18 may take the form of a rubber sleeve such as illustrated in Figure 2, the rubber sleeve being adapted to be snugly fitted over the spout 10.

The wall of the cylindrical chamber 12 is provided with an opening 19 with which is associated a spout 20 that may be closed by a closure member 21 that is preferably screwed on to the spout 20, the wing construction at 22 facilitating this screwing operation. When the closure member 21 is removed a required amount of water may be introduced through the spout 20 and opening 19 into the cylindrical chamber 12, and after this water has been introduced into the chamber 12 the closure member 21 is positioned to close the spout 20.

The end closure 14 is formed with a tubular extension 23 which is exteriorly threaded, as shown at 24, and an air pump designated 25 passes through this tubular extension 23 into the cylindrical chamber 12. This air pump 25 has an air discharge represented at 26 at a point closely adjacent to the bottom of the chamber 12.

The air pump 25 is shown as formed with a flange 27 that engages against a packing element 28 that bears against the extremity of the tubular extension 23. A flanged nut 29 is screwed on the threads 24, and bears against the flange 27 to maintain the pump 25 assembled within the chamber 12. This flanged nut 29 is formed with an opening 30 through which passes the plunger 31 of the pump 25. This plunger 31 is provided with an operating member in the form of a handle 32.

The detailed construction of the pump 25 is not here illustrated and described, because air pumps of this type are well-known and available to the purchasing public as such. When the apparatus is to be used, a required amount of water is introduced into the chamber 12 through the spout 20, after which the spout is closed by the closure 21. The water in the chamber is represented at 33. The coupling element 18 is now connected to the spout 10 of the faucet F, after which the handle 32 is grasped by the operator and the plunger 31 reciprocated in the well-known manner.

The operation of the plunger 31 of the pump 25 in this manner causes air under pressure to be introduced in the bottom of the cylindrical chamber 12 whereupon it passes upwardly through the water and is forced through the opening 15 and flexible conduit 16 into the faucet F. As the pressure of the air is built up it exceeds that of the beer in the kegs K so that the air forces the beer backwardly into the keg K and replaces the beer in the conduit 11.

After the beer in the conduit 11 has been replaced by compressed air the apparatus is disconnected by removing the coupling element 18 from the spout 10, whereupon it may be attached to the next faucet which is to be treated in a similar manner.

During the overnight period of nonuse the air in the conduit 11 will rise in temperature, but when the tap room owner opens for business in the morning he opens the faucet 11 to permit the escape of the air. Thus the first beer which reaches the faucet will have been maintained in a cooled state in the keg K, and will be in a properly salable condition.

It is notable that further beneficial results are evidenced in the effect of the purified air on the beer. With the air thus clarified it is evident that it cannot harm the beer, while it may have some desirable effects thereon due to some little oxidation which may take place.

While a preferred specific embodiment of the invention is hereinbefore set forth it is to be clearly understood that I am not to be limited to the exact construction illustrated and described, because various modifications of these details may be provided in putting the invention into practice within the purview of the appended claims.

I claim:

1. In combination with a beer dispensing system including a dispensing faucet and means for cooling beer in the dispensing system, apparatus for replacing the beer in the dispensing system between the faucet and cooling means with compressed air comprising a chamber adapted to contain water, means for conductively connecting said chamber to the faucet, and means for introducing air under pressure into the said chamber whereby the air is passed through the water and then forced into the faucet against the pressure of the beer in the system.

2. In combination with a beer dispensing system including a dispensing faucet and means for cooling beer in the dispensing system, apparatus for replacing the beer in the dispensing system between the faucet and cooling means with compressed air comprising a cylindrical chamber formed with a water inlet and outlet opening, a closure for the water inlet opening, a flexible conduit extending from the outlet opening including a coupling for detachably connecting the same to a faucet, and an air pump in said chamber.

3. Apparatus of the character described comprising a cylindrical chamber formed with a water inlet opening and an air outlet opening, a closure for the inlet opening, a flexible conduit connected to the outlet opening, a coupling element on the extremity of said flexible conduit, an air pump extending into said chamber, and means for operating said air pump.

4. Apparatus of the character described comprising a cylindrical chamber formed with a water inlet opening and an air outlet opening, a closure for the inlet opening, a flexible conduit connected to the outlet opening, a coupling element on the extremity of said flexible conduit, an air pump extending into said chamber and having an air outlet opening adjacent to the bottom of the chamber, and means for manually operating said air pump.

WILLIAM G. DOH.